US012133823B2

(12) United States Patent
Pitt

(10) Patent No.: US 12,133,823 B2
(45) Date of Patent: Nov. 5, 2024

(54) PATIENT SUPPORT APPARATUS

(71) Applicant: Rachel Pitt, South Wales (GB)

(72) Inventor: Rachel Pitt, South Wales (GB)

( * ) Notice: Subject to any disclaimer, the term of this patent is extended or adjusted under 35 U.S.C. 154(b) by 442 days.

(21) Appl. No.: 17/420,869

(22) PCT Filed: Dec. 5, 2019

(86) PCT No.: PCT/GB2019/053436
§ 371 (c)(1),
(2) Date: Jul. 6, 2021

(87) PCT Pub. No.: WO2020/144448
PCT Pub. Date: Jul. 16, 2020

(65) Prior Publication Data

US 2022/0062080 A1 Mar. 3, 2022

(30) Foreign Application Priority Data

Jan. 9, 2019 (GB) ..................................... 1900280

(51) Int. Cl.
*A61G 7/10* (2006.01)
*A61G 9/00* (2006.01)

(52) U.S. Cl.
CPC ......... *A61G 7/1059* (2013.01); *A61G 7/1009* (2013.01); *A61G 7/1019* (2013.01); *A61G 7/1046* (2013.01); *A61G 7/1065* (2013.01); *A61G 7/1088* (2013.01); *A61G 7/109* (2013.01); *A61G 7/1092* (2013.01); *A61G 9/003* (2013.01); *A61G 2200/34* (2013.01); *A61G 2203/20* (2013.01)

(58) Field of Classification Search
CPC .. A61G 7/1059; A61G 7/1009; A61G 7/1019; A61G 7/1046; A61G 7/1065; A61G 7/1088; A61G 7/109; A61G 7/1092; A61G 9/003; A61G 2200/34; A61G 2203/20; A61G 7/1007
See application file for complete search history.

(56) References Cited

U.S. PATENT DOCUMENTS 2,614,267 A * 10/1952 Perri .................... A61G 7/1046 5/86.1
2,854,673 A * 10/1958 Witt ..................... A61G 7/1046 414/665
3,829,916 A * 8/1974 James .................. A61G 7/1046 5/83.1
4,399,572 A * 8/1983 Johansson ............ A61G 7/1059 297/DIG. 2
4,487,019 A * 12/1984 Johansson ............ A61G 7/1046 91/401

(Continued)

FOREIGN PATENT DOCUMENTS

EP 2684550 A1 1/2014
GB 2381256 A * 4/2003 ............. A61G 1/017

(Continued)

OTHER PUBLICATIONS

GB-2381256-A English Translation (Year: 2003).*

(Continued)

*Primary Examiner* — Justin C Mikowski
*Assistant Examiner* — Amanda L Bailey
(74) *Attorney, Agent, or Firm* — Gordon & Jacobson, P. C.

(57) ABSTRACT

A patient support apparatus is disclosed.

16 Claims, 12 Drawing Sheets

(56) References Cited

U.S. PATENT DOCUMENTS

| | | | | |
|---|---|---|---|---|
| 5,112,076 | A * | 5/1992 | Wilson | A61G 5/0875<br>5/81.1 R |
| 5,355,538 | A * | 10/1994 | Fulford | A61G 7/1046<br>5/81.1 R |
| 7,003,820 | B1 * | 2/2006 | Iura | A61G 5/128<br>5/83.1 |
| 8,528,127 | B1 * | 9/2013 | Gabaldon | A61G 7/1007<br>4/480 |
| 2007/0124859 | A1 | 6/2007 | Stryker et al. | |
| 2010/0287698 | A1 | 11/2010 | Stryker | |
| 2011/0016627 | A1 | 1/2011 | Blevins et al. | |
| 2012/0292883 | A1 | 11/2012 | Noonan et al. | |
| 2014/0115778 | A1 * | 5/2014 | Ng | A61G 7/1061<br>5/83.1 |
| 2014/0208493 | A1 | 7/2014 | Ahmed | |
| 2018/0055705 | A1 | 3/2018 | Sineath, Jr. et al. | |

FOREIGN PATENT DOCUMENTS

| | | | | |
|---|---|---|---|---|
| JP | S59211451 | A | 11/1984 | |
| JP | 2005329215 | A | 12/2005 | |
| JP | 4776736 | B1 * | 9/2011 | A61G 5/006 |
| JP | 2014012069 | A | 1/2014 | |

OTHER PUBLICATIONS

JP-4776736-B1 English Translation (Year: 2011).*

Search Report and Written Opinion dated Mar. 13, 2020 of International Application No. PCT/GB2019/053436.

EP Office Action dated Oct. 9, 2023 of Application No. 19 820 856.3-1113.

Japanese Office Action dated Mar. 5, 2024 of Application No. 2021-540151.

* cited by examiner

PATIENT SUPPORT APPARATUS

CROSS-REFERENCE TO RELATED APPLICATIONS

This application is the National Stage of International Patent Application No. PCT/GB2019/053436 filed on Dec. 5, 2019, which claims priority from a UK Patent Application No. GB 1900280.7 filed on Jan. 9, 2019, both of which are hereby incorporated by reference herein in their entireties.

FIELD

The invention relates to a patient support apparatus. The invention may also relate to a patient toileting apparatus or a patient transporting apparatus.

BACKGROUND

For patients with certain temporary and permanent conditions it is a possibility they may be bed bound for a period of time in which they will require assistance with many everyday aspects of life. One example of a task which may be troublesome is toileting.

Toileting is often carried out by taking a patient to a toilet or by using a commode chair. For some patients they may be fitted with a disposable nappy or they are manually lifted into a bed pan where they are toileted.

Toileting patients in these ways can often be troublesome for medical staff as it is labour intensive—requiring often at least two nurses to attend—and undignifying for the patient.

Aspects and embodiments were conceived with the foregoing in mind.

SUMMARY

Aspects relate to a patient support apparatus. Further aspects may also relate to a patient toileting apparatus or a patient transportation apparatus.

Viewed from a first aspect, there is provided a patient support apparatus for supporting a patient above a first surface, the apparatus comprising a support frame movable across a second surface to a position adjacent the first surface and a support portion extending outwardly relative to the support frame, the support portion positionable on the first surface to enable the patient to be moved onto the support portion so that the patient is held on the support portion above the first surface.

The first surface may be a bed, such as, for example, a hospital bed. The second surface may be a floor such as, for example, a hospital floor. The support portion may be placed into contact with the first surface when it is being used to place a patient in a supported position.

The patient support apparatus may also be a patient toileting apparatus or a patient transportation apparatus.

The support portion may be movable from a stowed position to a deployed position where it can be used to support a patient.

A patient support apparatus in accordance with the first aspect can be moved to a position adjacent a surface on which a patient is lying. An example of such a surface is a hospital bed where a bed ridden patient may be lying. The support portion can then be placed onto the surface and the patient can then be manoeuvred onto the support portion without the necessity to lift the patient. That is to say, the patient can be rolled onto the support portion which is a less strenuous exercise for an attending medical professional.

Once secured on the support portion the patient can then be, for example, toileted or cleaned, or transported elsewhere by the patient support apparatus.

An apparatus in accordance with the first aspect removes the need to use a hoist to lift a bed ridden patient onto a separate structure such as a transportation wheelchair or a commode when they need to be supported in a position for, say, toileting, washing, or transportation.

An apparatus in accordance with the first aspect enables a patient to be supported in a suspended position above a surface, such as, for example, a bed, and the bed lowered, say, to enable a bedpan or the like to be positioned appropriately.

The support frame of the apparatus can be positioned alongside a surface, such as a bed, where part of the frame, which may be called legs, extend under the bed to provide stability for the apparatus.

The apparatus in accordance with the first aspect can be used where a patient is lying in the supine or prone position.

The support portion may comprise a limb extending outwardly relative to the support frame, wherein the limb may comprise a first major surface for supporting the patient above the first surface and a second major surface to be positioned adjacent the first surface to bound a bed receiving cavity for the apparatus.

The bed receiving cavity defines a space which accommodates a bed when the patient is being taken from the bed. The support portion will extend over at least a portion of the footprint of the bed so that can be positioned on the bed.

The first major surface may form a seat portion for supporting the patient during support by the support portion and the second major surface is the underside of the support portion and effectively rests on the first surface when the patient is being moved onto the support portion.

The support frame may comprise a base member which may form a base for the apparatus and which bounds the bed receiving cavity. The base member may be formed from two longitudinal members joined by a cross member between the two longitudinal members.

The base member may comprise legs which are configured to extend under the first surface when the apparatus is moved into a position where the patient is transferred onto the support portion when the support portion is extending over a footprint of the first surface.

The support frame may comprise a plurality of castors or wheels to enable the apparatus to be moved across the second surface to a position adjacent the first surface.

The use of wheels or castors aids the manoeuvrability of the patient support apparatus. That is to say, the use of wheels or castors, which may be placed on the base portion of the support frame of the patient support apparatus, enable the patient support apparatus to be moved and positioned more easily.

The support portion may be configured to support the patient in a seated position.

The support portion may comprise a seat portion arranged to support the patient in a seated position when they are being held by the support portion. The effect of this is that the patient is supported in a seated position which is more comfortable than a prone or supine position.

The support portion may comprise a hand rail. The hand rail provides support for the patient when they are being supported on the apparatus.

The hand rail may comprise a boom or jib which extends from the support frame to form part of the support portion.

The hand rail may extend in a direction from the support frame which is substantially parallel to the support portion.

The hand rail may comprise a bent section which forms a c-shape extending outwardly at first end proximal to the support frame and around to a second end distal relative to the support frame.

The hand rail may be formed from a first straight member which extends outwards relative to the support frame to a bent section which then bends toward a seat portion and continues to a second straight member which extends from the bent section back to the support frame.

The hand rail may comprise a cushion section disposed along its length to increase the comfort for the patient who is being supported on the apparatus.

The seat portion may comprise first and second discrete parts which are arranged to be drawn apart and pushed together in order to support different sizes of patient.

The first part of the seat portion may be mounted to a first slider arranged to slide along the boom or jib in a first direction. The second part of the seat portion may be mounted to a second slider arranged to slide along the boom or jib in a second direction which is opposite the first direction. The second part and first part may be pushed together or drawn apart by pushing (or pulling) the first slider along the boom or jib in the first direction and by pushing (or pulling) the second slider along the boom or jib in the second direction.

In use a gap may be maintained between the first part and the second part to facilitate toileting.

The hand rail may be movable in a first plane and a second plane transverse relative to the first plane. This may be best illustrated using the example where the first surface is a bed. The first plane may be transverse to the longitudinal axis of the bed, i.e. it may span the patient and the second plane may extend in the direction of the longitudinal axis of the bed.

The hand rail may be hinged to the support portion to enable movement in the first and/or second planes.

The movement of the hand rail may be electrically actuated response to user input from a control system. That is to say, the movement of the hand rail may be controlled by a user who directs the movement of the hand rail in both a first and second plane using a button which may control the movement in the first plane and a button which controls the movement in the second plane.

The support portion may comprise a back rest portion which may be coupled at a first end to the support portion and may further comprise a free-end which is arranged to be pulled around the back of the patient and attached to the support portion or the hand rail to secure the patient in the seated position on the support portion.

The position at which the back rest portion is attached to the support portion of the hand rail may be adjusted between a plurality of different positions in order to realise a plurality of tensions when the support portion is being used to support a patient on the apparatus.

The height of the support portion may be adjustable, which may be implemented electronically using a control system which receives input from a user to increment the height of the support portion in an upward or downward direction to align the support portion with the first surface.

The control system may be configured to generate an alarm responsive to the height of the support portion exceeding a safety threshold.

The apparatus may comprise a visual indication portion to indicate the height of the support portion has exceeded a safety threshold. The visual indication portion may be a coloured portion on the support frame or support portion which indicates that the height has exceeded a threshold where the apparatus is determined to be safe.

The support portion may comprise an aperture to facilitate toileting. The aperture may be formed in a seat portion which supports the patient in a seated position.

The apparatus may further comprise a bed pan portion arranged to receive human waste from the patient held on the support portion. Human waste typically means faecal matter or urine but can be anything excreted by a human being.

The bed pan portion may be movable between a first position underneath the aperture and a second position to facilitate disposal of the human waste. The bed pan portion may be slidably movable between the first position and the second position.

The slidable movement may be implemented using a pair of frame members mounted on rollers which are attached to the frame of the patient support apparatus.

BRIEF DESCRIPTION OF THE DRAWINGS

An embodiment of the invention will now be described by way of example only and with reference to the following drawings.

DETAILED DESCRIPTION OF THE PREFERRED EMBODIMENTS

Figure 1:
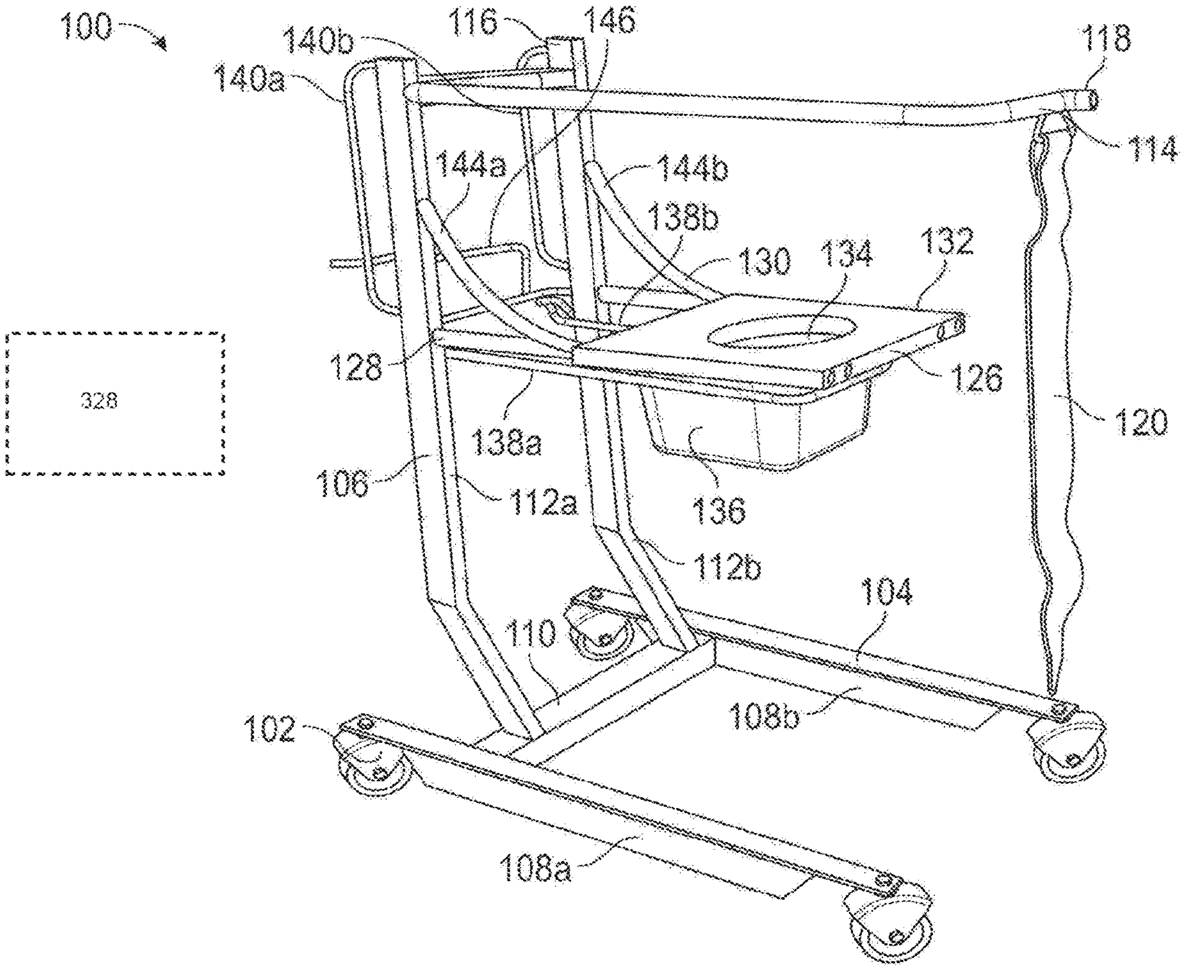
FIG. 1 illustrates a patient support apparatus in accordance with the embodiment.

We will now illustrate with reference to FIG. 1 a patient support apparatus 100 in accordance with the embodiment.

Patient support apparatus 100 comprises a plurality of castors 102 placed at each corner of a base portion 104 of a support frame 106. The base portion 104 comprises first longitudinal member 108*a* and second longitudinal member 108*b* and cross member 110 extending between first longitudinal member 108*a* and second longitudinal member 108*b*.

The first longitudinal member 108*a* and the second longitudinal member 108*b* effectively form legs for the support frame 106. The legs, as will be illustrated in FIGS. 2*a* to 2*h*, enable the patient support apparatus to extend over the footprint of the bed when they are in use to support a patient. They also provide balance to the support frame 106. Support frame 106 further comprises first upstanding member 112*a* and second upstanding member 112*b* which extend upwardly relative to the cross member 110 and the first longitudinal member 108*a* and the second longitudinal member 108*b*.

A hand rail 114 is coupled to second upstanding member 112*b* at a first end using a first hinge and a second hinge (not shown) which enable movement of the hand rail 114 in two planes. The hand rail 114 extends outwardly relative to the second upstanding member 112*b* in a U-shape from the first end 116 to a second end 118. The movement of the hand rail 114 will be described later.

First handle 140*a* and second handle 140*b* extend outwardly relative to respective first upstanding member 112*a* and second upstanding member 112*b* and enable a medical practitioner to comfortably and ergonomically operate the patient support apparatus 100. Alternatively, a single handle may extend between the first upstanding member 112*a* and second upstanding member 112*b*.

A back rest 120 is coupled to the second end 118 of the hand rail 114. In FIG. 1 the back rest 120 is pictured hanging downwardly relative to the second end 118 of the hand rail 114 but its further functionality will be described later.

The plurality of castors 102 enable a wide range of motion of the patient support apparatus 100 to be realised when the patient support apparatus 100 is being used either free of a patient or with a patient on the support portion 126.

At an intermediate position between the base portion 104 and the top of the respective first upstanding member 112*a* and the second upstanding member 112*b* there is provided a patient support portion 126.

The patient support portion 126 extends outwardly on first support member 128 and second support member 130 to a seat portion 132 for supporting a patient in the seated position when they are being supported on the apparatus 100. Further first and second bend portions 144*a* and 144*b* provide further mechanical support to the patient support portion 126. The patient support portion 126 may be movable between a stowed position and a deployed position where it can be used to support the patient.

The seat portion 132 comprises a toileting aperture 134 to enable the evacuation of human waste from the patient when they are toileting. Human waste includes general human excretion such as urine and faecal matter. Disposed immediately below the seat portion 132 is a bed pan 136 which is mounted on first rail 138*a* and second rail 138*b* to enable the bed pan to be slid in and out between toileting and retrieval positions—which will also be described later. For avoidance of doubt, in the toileting position the bed pan 136 will be positioned immediately below the seat portion 132 and in the retrieval position the bed pan will be outside of the general profile of the apparatus so that can be easily accessed by the attending medical practitioner.

The first rail 138*a* and second rail 138*b* may be mounted on wheels mounted to the respective innermost surface of upstanding members 112*a* and 112*b*. The first rail 138*a* and second rail 138*b* are joined by a handle 146 for ease of use by a medical practitioner.

We will now describe the use of the patient support apparatus 100 in toileting a bed-ridden patient 200 with reference to FIGS. 2*a* to 2*g*.

Figure 2A:
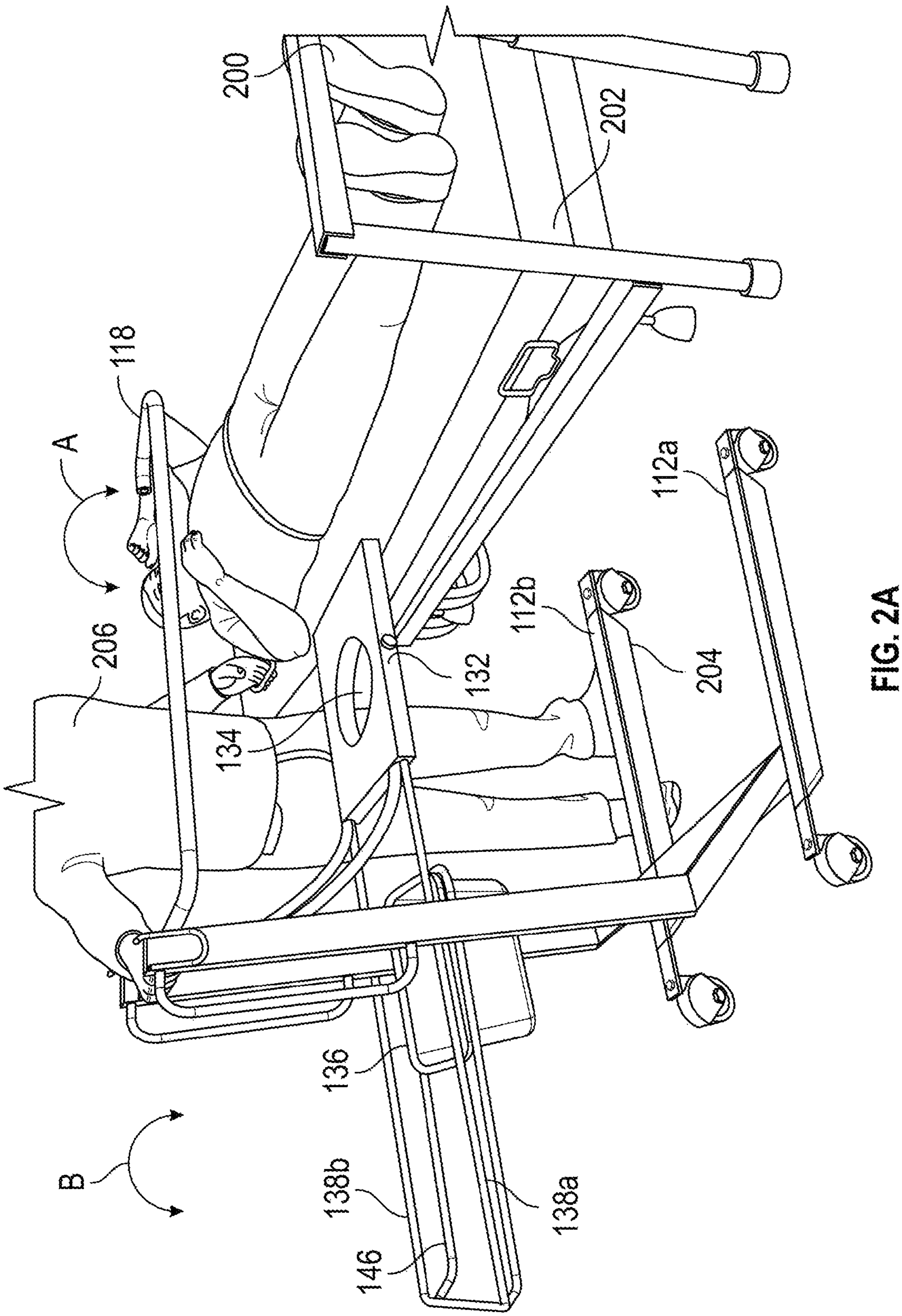
FIGS. 2*a* to 2*g* illustrate the use of a patient support apparatus in accordance with the embodiment in order to toilet a patient.

FIG. 2*a* illustrates the patient support apparatus 100 being moved to the side of a bed 202 on which patient 200 is lying. The patient support apparatus 100 is typically moved by a medical practitioner 206 using first handle 140*a* and second handle 140*b* to manoeuvre the patient support apparatus 100 into place.

The height of the seat portion 132 is aligned with the top surface of the bed 202 either electrically using an electrical actuator which can be used to raise or lower the height of the seat portion 132 responsive to user input through a control system mounted to the apparatus 100.

Figure 3:
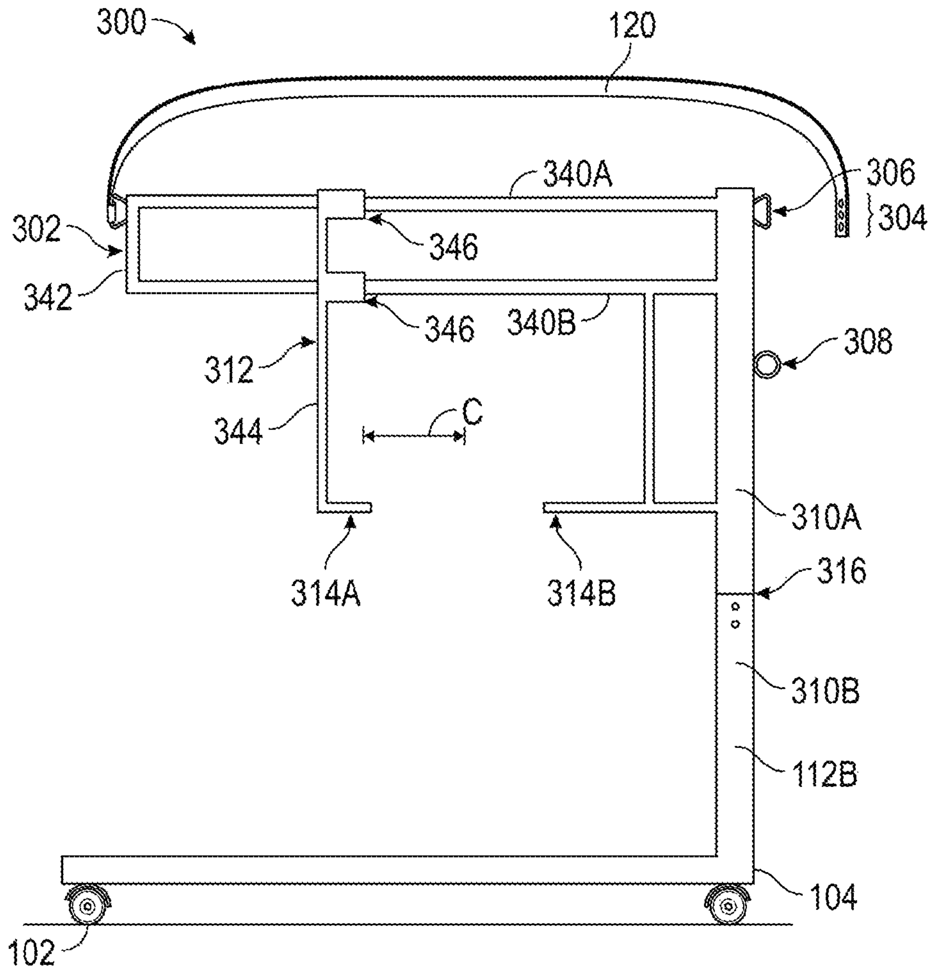
FIG. 3 illustrates a patient support apparatus comprising a boom or jib in accordance with the embodiment.
Figure 4:
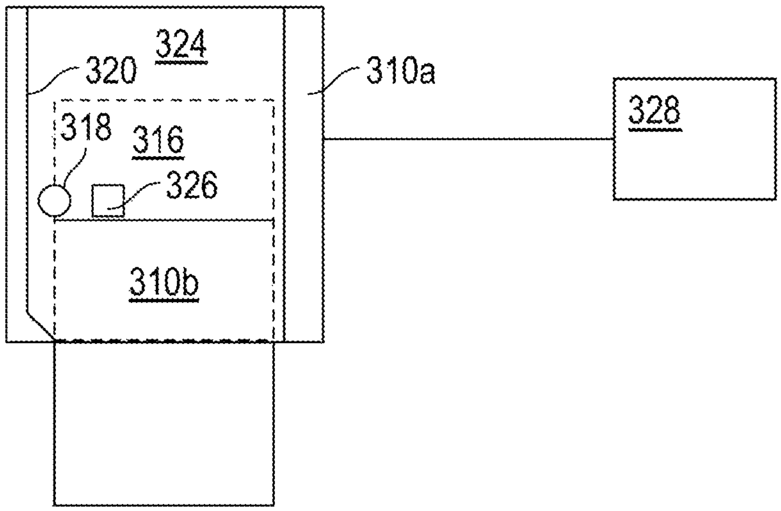
FIG. 4 illustrates a patient support apparatus where the height of the support portion is safe in accordance with the embodiment.
Figure 5:
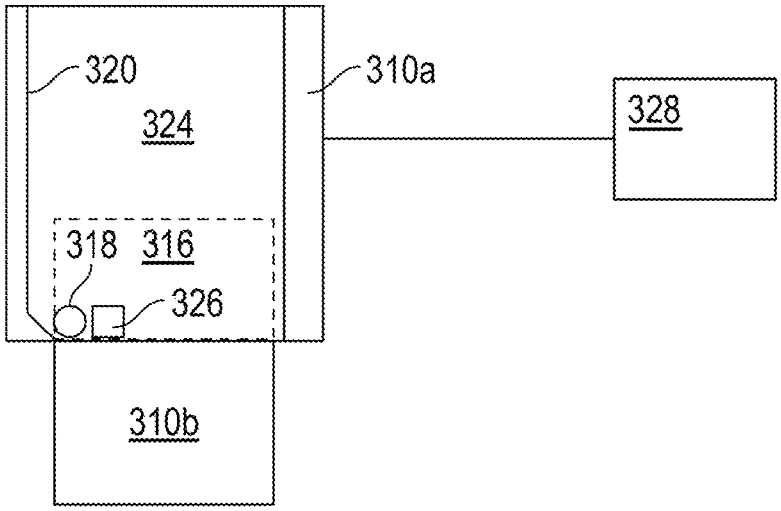
FIG. 5 illustrates a patient support apparatus where the height of the support portion is unsafe in accordance with the embodiment.

The height of the seat portion 132 can be electronically adjusted using an actuation identical to the electric motor and actuator described in reference to FIGS. 3, 4 and 5.

The height of the seat portion 132 may alternatively be aligned with the top surface of the bed 202 by adjusting the height of the bed 202 so that the top surface of the bed 202 is at a height which will enable the seat portion 132 to be rested on the top surface of the bed 202.

The hand rail 114 is moved into position by moving it in direction B, i.e. in the plane which is perpendicular to the longitudinal axis of the bed 202 and in direction A, i.e. in the plane parallel to the longitudinal axis of the bed 202. That is to say, in a typical use case where the patient is lying along the bed, direction B would be the direction across the patient 200 and direction A would be the direction along the patient 200 as they are lying on the bed in the supine or prone position. The movement of the hand rail 114 may also be controlled by an electrical actuator coupled to the first hinge and the second hinge which controls the movement of the hand rail 114 responsive to user input on a control panel.

The area between the bottom face of the seat portion 132 and the first longitudinal member 108*a* and the second longitudinal member 108*b* is a bed receiving cavity 204. The bed receiving cavity 204 is where the patient support apparatus 100 accommodates the area of the underside of the bed 202.

Figure 2B:
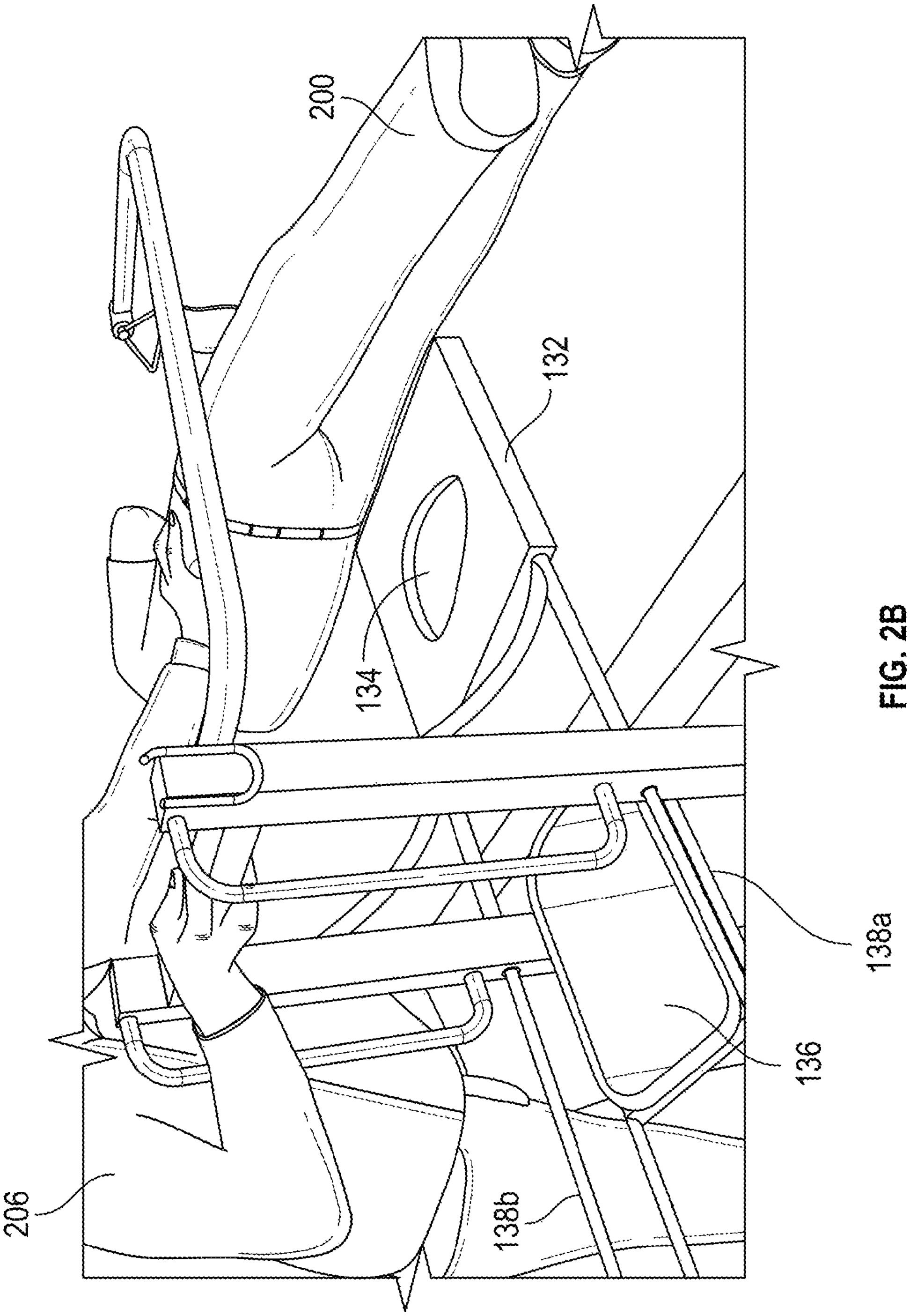

This is necessary to enable the seat portion 132 to be placed onto the bed, as seen in FIG. 2*b* as to enable this to happen the apparatus 100 needs to accommodate some of the footprint of the bed 202 so that the seat portion 132 can be placed onto the top surface of the bed 202. That is say, the bed receiving cavity 204 is defined between the bottom face of the seat portion 132 and the longitudinal members 108*a* and 108*b* which form the base portion 104 of the patient support apparatus 100. The bed receiving cavity 204 accommodates the area of the underside of the bed which is necessary to enable the seat portion 132 to be placed onto the bed 202. The first longitudinal member 108*a* and the second longitudinal member 108*b* form legs which extend underneath the bed 202 and provide a stable base for the patient support apparatus 100. In another example, the bed 202 may be pushed into the space between the seat portion 132 and the longitudinal members 108*a* and 108*b* before the relevant adjustments are made to the height of the seat portion 132 and/or the bed 202.

The handrail 114 is positioned to enable the patient 200 to grab the handrail 114 when they are placed into a seated position.

As the seat portion 132 is placed onto the bed 202 the patient 200 is rolled out of the way by a medical practitioner 206 and onto their side until the seat portion is in position extending over a part of the footprint of the bed 202. This is clear from FIG. 2*b* where the seat portion 132 is placed onto the top surface of the bed 202. That is to say, the medical practitioner 206, when using the apparatus 100, need only roll the patient 200 out of the way in order to properly position the apparatus 100. No lifting is required and no hoists are required. This is therefore easier for the medical practitioner 206 and more dignifying for the patient 200.

Figure 2C:
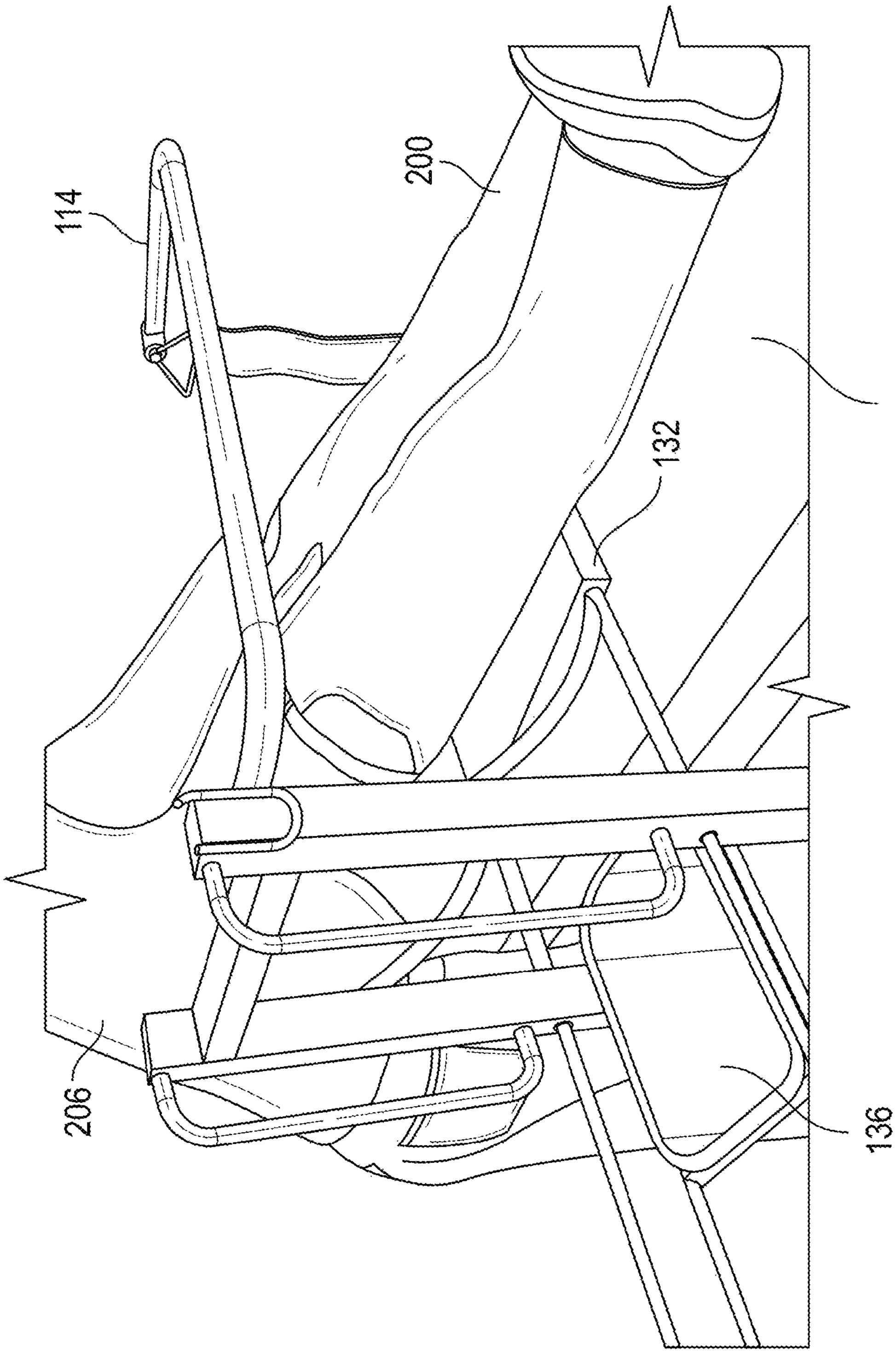

The patient 200 is then rolled back into the supine position by the medical practitioner 206 as can be seen in FIG. 2*c*. The buttocks of the patient 200 are rested onto the seat portion 132.

In the toileting example, the bed pan 136 is moved out of the way whilst the patient is secured into position on the apparatus 100. However, in other examples, where the apparatus 100 is not used for toileting, the bed pan 136 would not be present and could be removed completely.

Figure 2D:
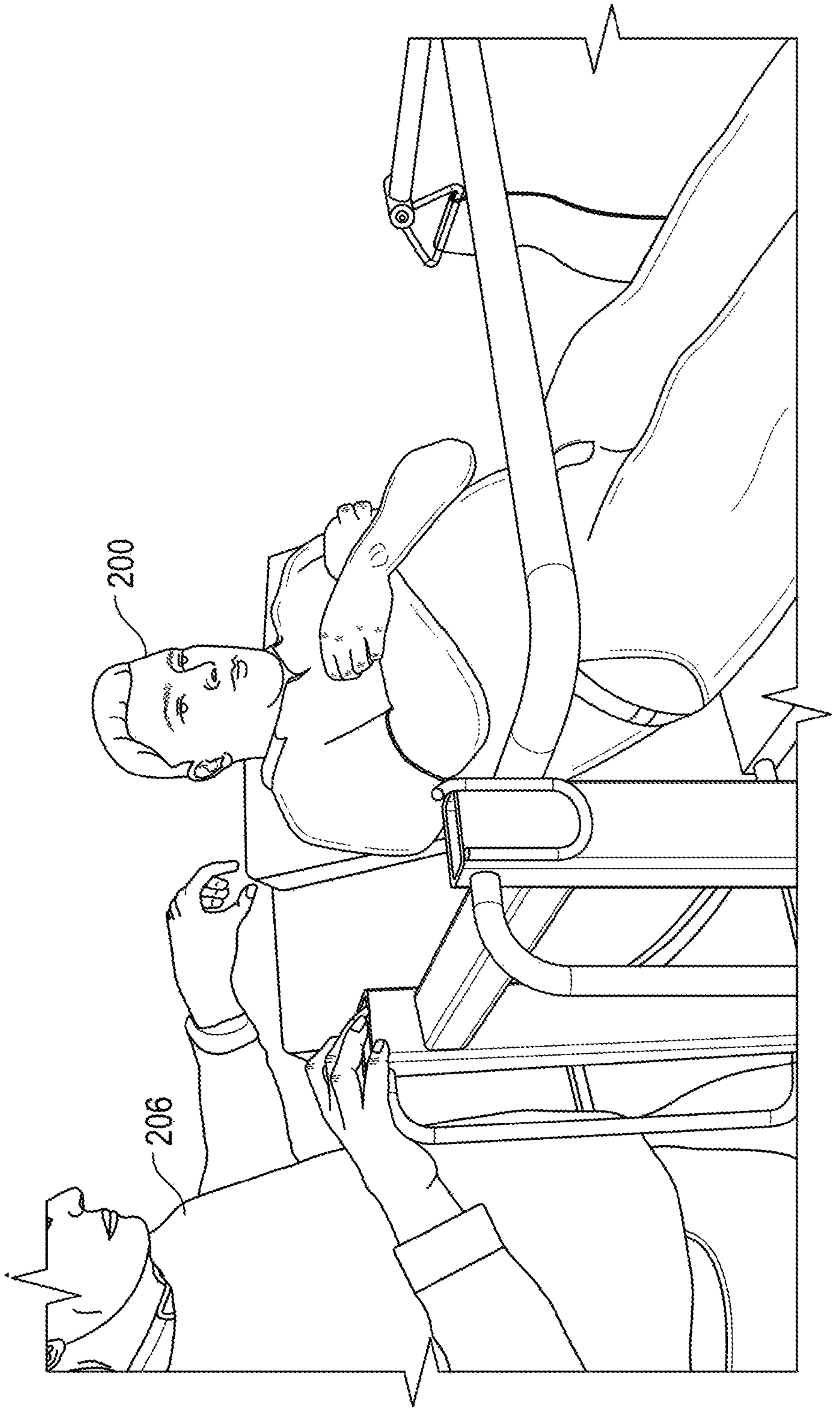

The medical practitioner 206 can then operate the bed 202 to lift the back of the patient 200 so they are not in the supine position anymore. This moves the patient 200 into a seated position on the seat portion 132. This is illustrated in FIG. 2*d*.

Many beds in hospital environments have electronic adjustment mechanisms so that patients can be moved between supine and seated positions. The medical practitioner 206 may alternatively lift the back of the patient 200 so that the patient 200 is lifted into a seated position in the absence of an electronically adjustable bed.

Supporting the patient 200 in a seated position is more comfortable for the patient and enables them to retain visibility in their environment—which is substantially less distressing than gathering the patient in a hoist and lifting them from the bed.

Figure 2E:
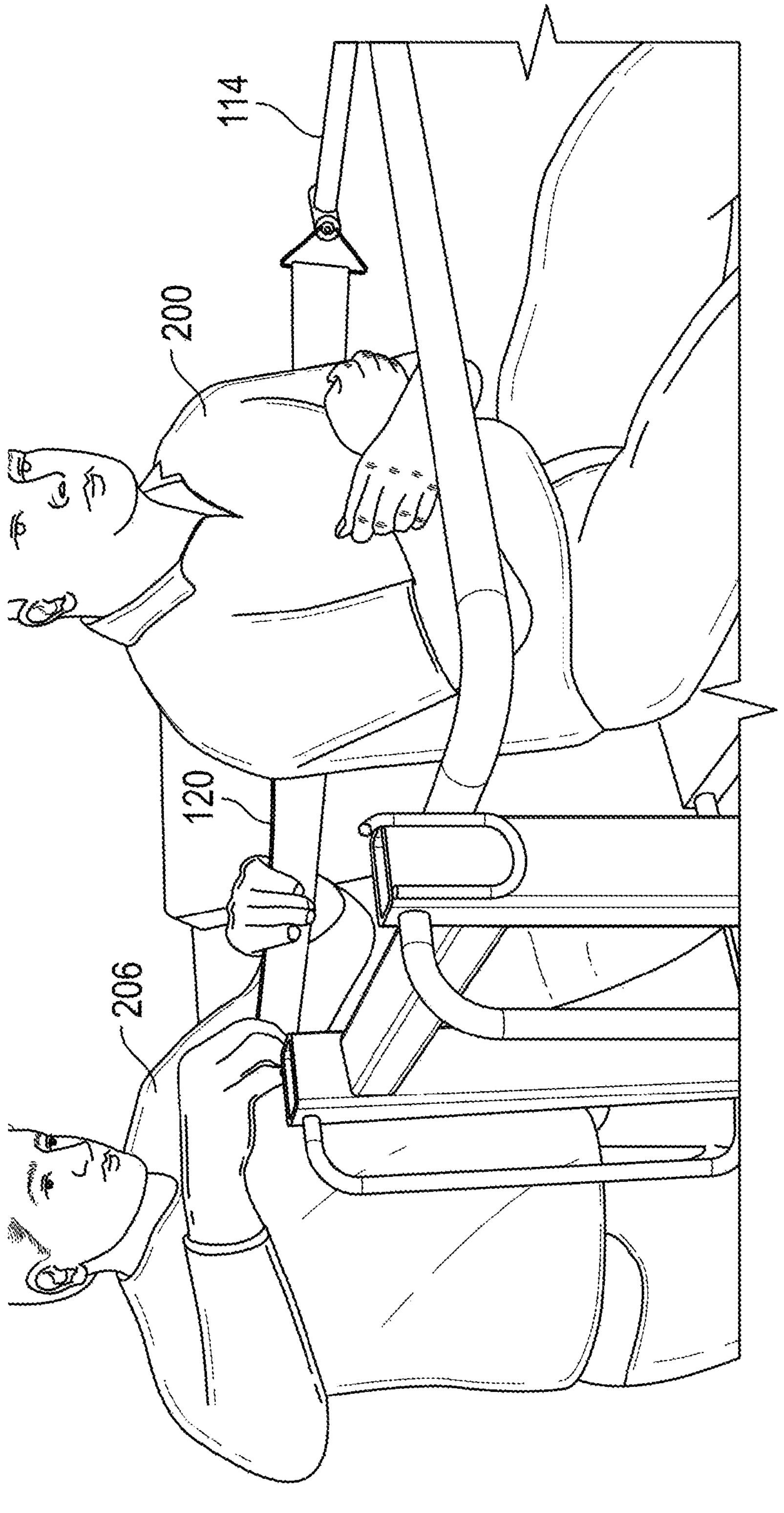

The back rest 120 is then pulled around and attached to the second upstanding member 112*b* to hold the patient 200 in position on the patient support apparatus 100. This is illustrated in FIG. 2*e*. The patient 200 can then be supported above the bed 202 in the seated position which will improve the patient's comfort and sense of wellbeing.

Figure 2F:
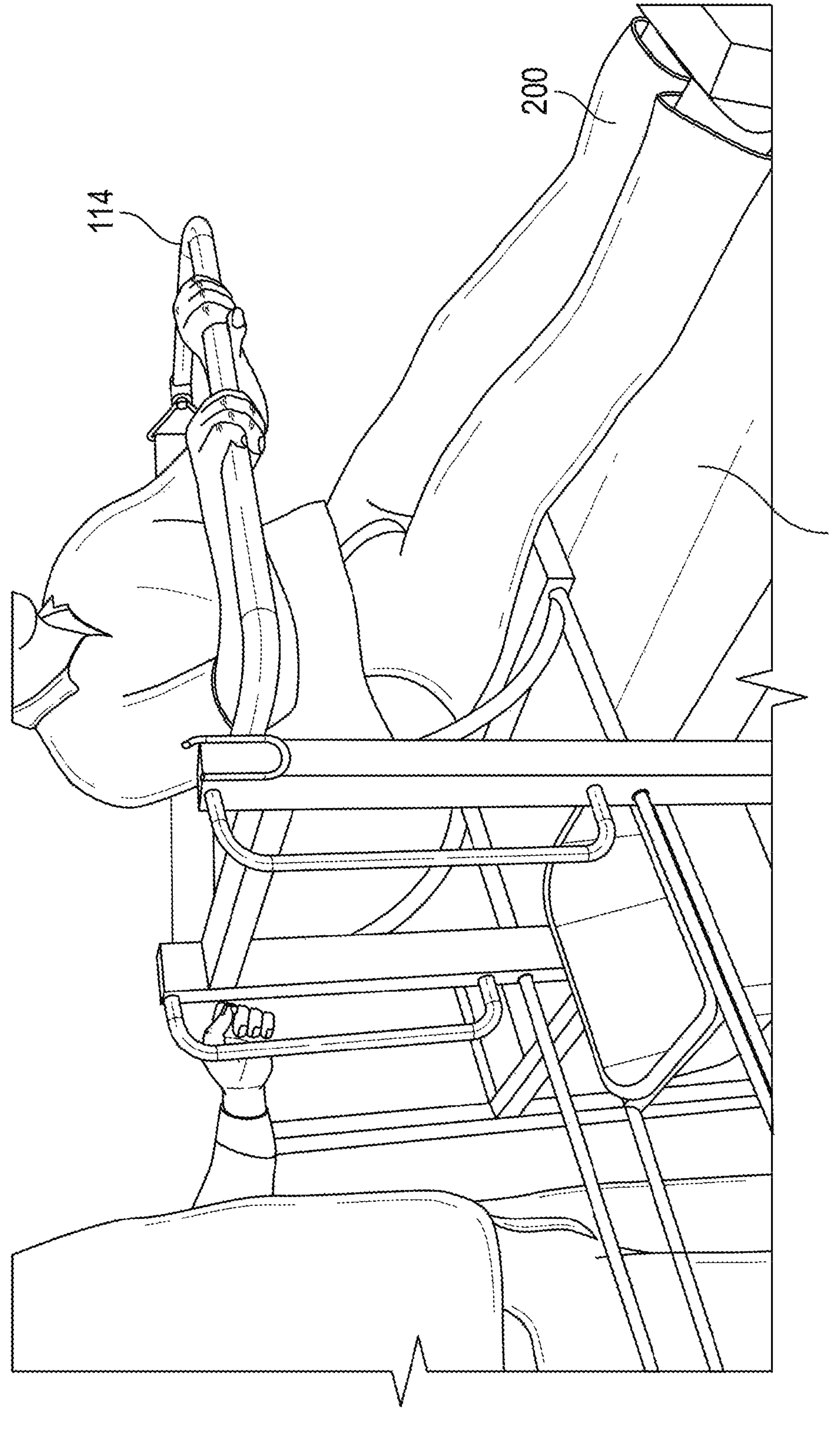

The patient is then held in a secure position on the seat portion 132 in a seated position whilst holding the hand rail 114 as illustrated in FIG. 2*f*. In this position the patient is seated on the seat portion 132 whilst the bed 202 can be lowered from underneath the patient 200 to place the patient 200 in a position where their legs are dangling from the seat portion 132. Alternatively, the height of the seat portion 132 may be electrically adjusted to raise the height of the seat portion 132 to bring the patient clear of the bed with their legs dangling.

Figure 2G:
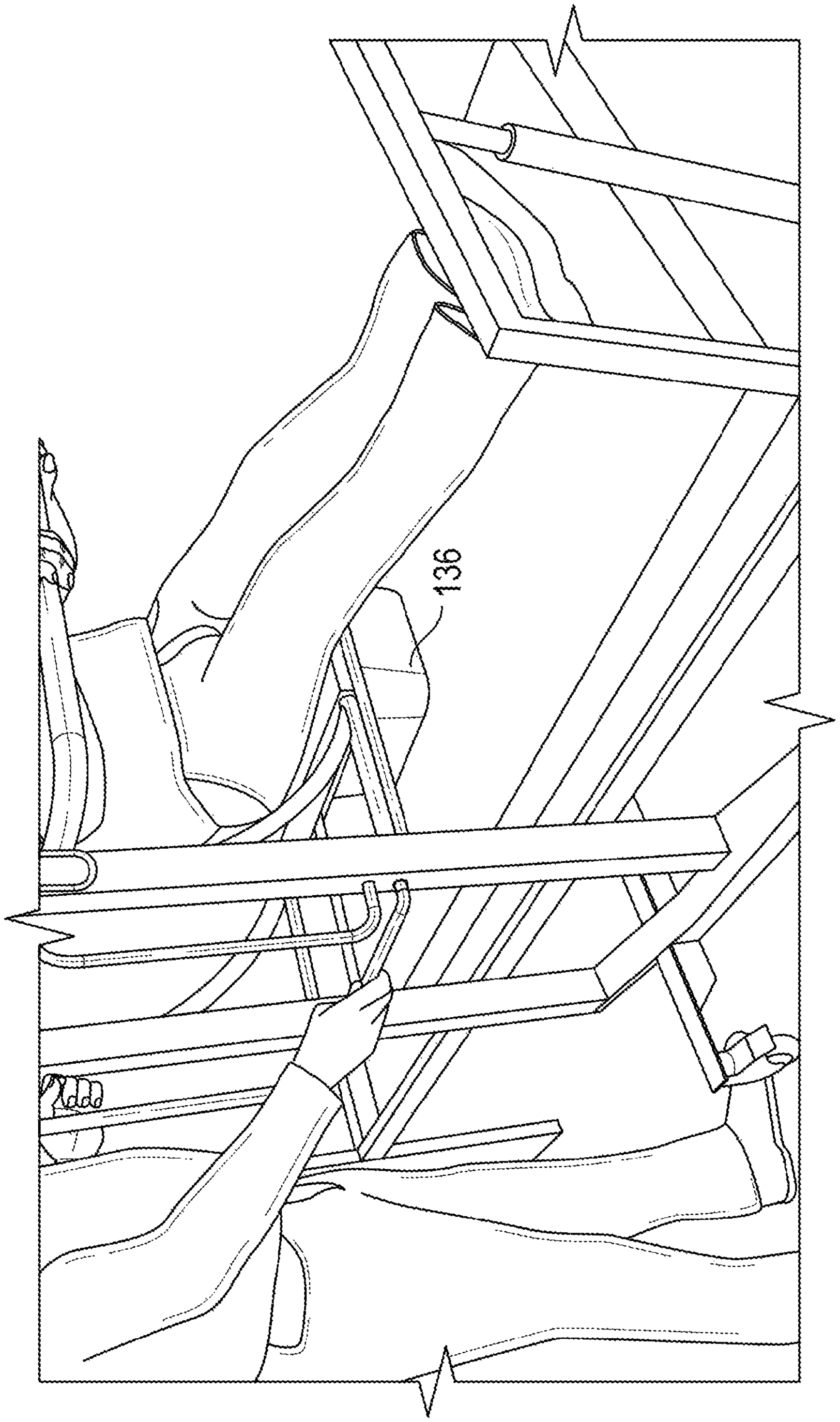

The bed pan portion 136 can then be slid underneath the toileting aperture 134 for the toileting to take place. This is illustrated in FIG. 2*g*. After the toileting has finished, the bed pan portion 136 can be moved from underneath the toileting aperture 134 and the bed pan portion removed so that the contents of the bed pan portion 136, i.e. the faecal matter or urine, can be processed elsewhere.

The patient 200 can then be reset into the supine position on the bed 202 and the apparatus 100 moved away for use elsewhere.

Alternatively, as the patient support apparatus 100 is supporting the patient in a seated position independently of the bed 202, the patient may be taken from the bed 202 and moved around, even when toileting is not taking place.

That is to say, the patient 200 can be toileted and transported away from the bed 202 without the use of a hoist, a wheelchair or a commode. This increases the dignity of the patient during the toileting process and also avoids the need for the heavy lifting of the patient 200 by a medical practitioner 206 during either toileting or transportation of the patient 200.

Figure 2H:
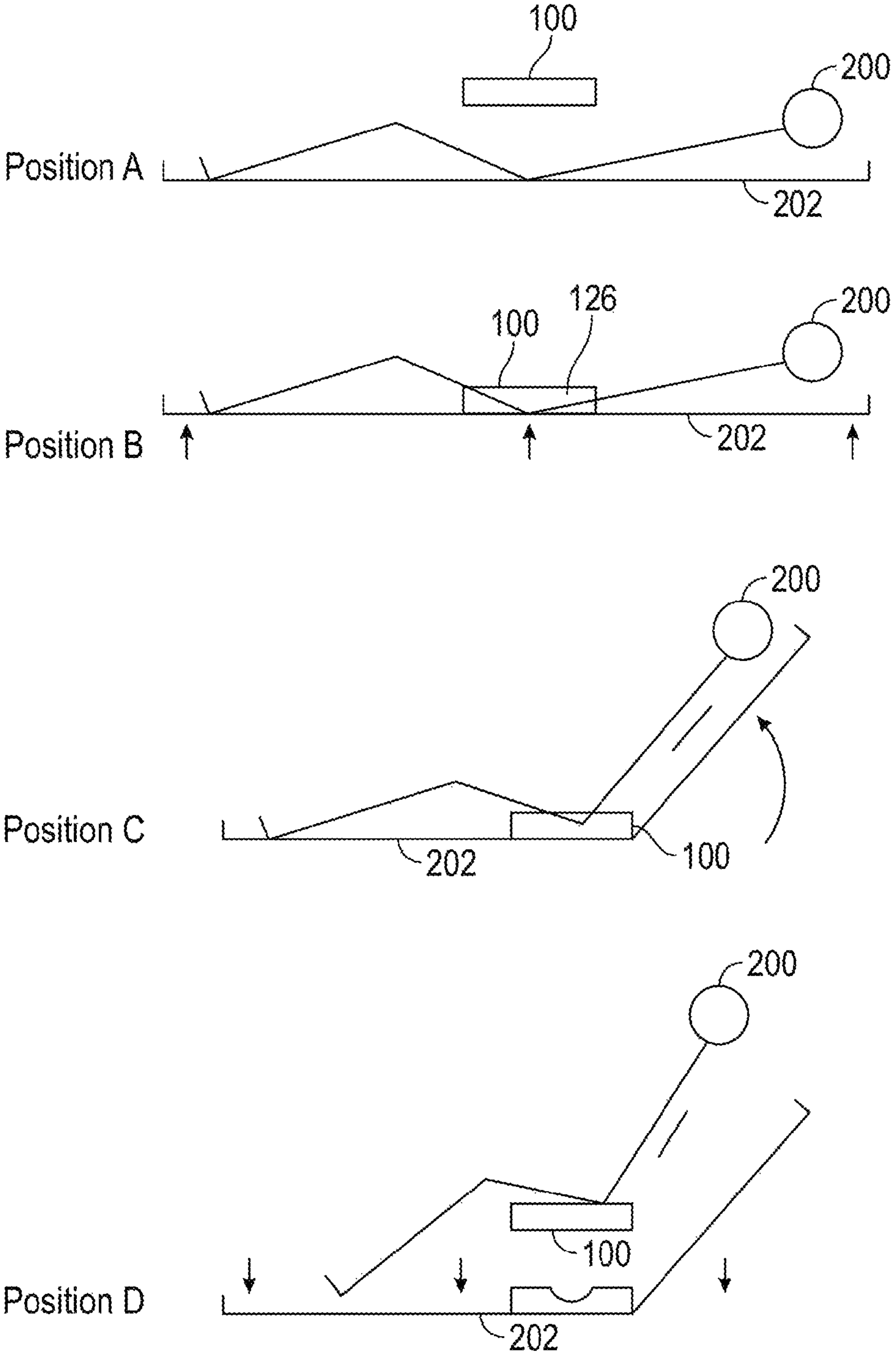
FIG. 2*h* schematically illustrates the position of the patient when they are being taken from a bed onto the patient support apparatus in accordance with the embodiment.

The steps detailed in FIGS. 2*a* to 2*g* are neatly summarised in schematic form in FIG. 2*h* where the profile of the patient 200 is clear. That is to say, it is clear that the patient is moved from a prone or supine position to a seated position using the apparatus 100.

In position A the patient 200 is lying in a substantially supine position whilst the apparatus 100 is brought to the side of the bed 202.

In position B, the bed 202 is raised so that the support portion 126 can be rested on the bed so that the patient 200 can be rolled onto the seating portion 132.

In position C, the lumbar mechanism in the bed 202 can be used to raise the patient 200 into a seated position on the seating portion 132.

In position D, the bed 202 can be lowered and the patient is now supported by the apparatus 100.

We now describe, with reference to FIG. 3, patient support apparatus 100 comprising a support portion of a different configuration but which can similarly be used in the same way as the patient support apparatus 100 described in respect of FIG. 1 and FIGS. 2*a* to 2*h*.

Patient support apparatus 100 described in FIG. 3 comprises a back rest 120 and a base portion 104 configured identically to the back rest 120 and base portion described in relation to FIG. 1 and FIGS. 2*a* to 2*h*.

Back rest 120 is pulled around the back of the patient 200 when they are being transferred from their bed 202 to the apparatus 100. Back rest 120 is coupled at a first end to a jib (or a boom) 300 which extends outwardly from the second upstanding member 112*b*.

Back rest 120 at a second end comprises a plurality of holes 304 along the length of the back rest which can be fixed onto a protrusion 306 which sticks out relative to the second upstanding member 112*b*. The plurality of holes 304 enable a variety of tensions to be realised with the back rest 120 when it is being used to support a patient 200 during toileting or transportation.

A push handle 308 may also be provided to enable the apparatus 100 to be moved by a medical practitioner 206.

The first upstanding member 112*b* and the second upstanding member 112*b* each comprise upper and lower sections, respectively 310*a* and 310*b*, wherein the upper section 310*a* is of a larger diameter than the lower section 310*b* and the lower section 310*b* is slidably received in the upper section 310*a* as the upper section 310*a* moves over the lower section 310*b* during height adjustment of the support platform 312. The support platform 312 is formed by first support platform section 314*a* and second support platform section 314*b*. The upper and lower sections are generally tubular, but not limited to a cylindrical geometry.

The support platform 312 is mechanically attached to the upper section 310*a* and the height adjustment of the support platform 312 is controlled by an electric motor and actuator inside the upper section 310*a* to drive the upward and downward motion of the respective upper section 310*a*. The upward and downward motion of the respective upper section 310*a* may be controlled responsive to user input on a control panel. The height adjustment of the support platform 312 may also be applied to support portion 126 as the adjustment in the relative height of upper section 310*a* may also be applied to the adjustment in height of the support portion 126 without any undue burden on the skilled person.

The lower section 310*b* may have a coloured section 316 at an upper end, which may be painted red to indicate danger, which visually indicates when the height has exceeded a safe height. The upper section 310*a* may have, in the vicinity of its lowest point, i.e. positioned close enough to have effect, a switch 318 which is triggered when the height has exceeded a safe height. The triggering of the switch 318 may generate an audible, visual or haptic alarm to indicate a safe height has been exceeded.

The generation of the alarm is illustrated with reference to FIG. 4 and FIG. 5.

In FIG. 4, upper section 310*a* has part of lower section 310*b* inside an internal chamber 324 of the upper section 310*a*, including coloured section 316. The internal chamber 324 has an inner wall 320 which extends around the circumference of the internal chamber 324. The inner wall narrows around a part which is aligned longitudinally with switch 318. Switch 318 is positioned at the lowermost part of the coloured section 316. The switch 318 is coupled to alarm generation circuit 326 which, upon movement of the switch due to the movement of the upper section 310*a* upwards to an unsafe height, i.e. to a height which exposes the coloured section 316, is configured to feed an alarm signal back to a control system 328.

FIG. 5 illustrates the relative position of the lower section 310*b* and upper section 310*a* which would lead to the generation of the alarm. That is to say, when the upper section 310*a* is moved upwards to a height which exposes the coloured section 316, the switch 318 is moved to a position which would lead to an alarm signal being transmitted to control system 328 which then generates an alarm. The alarm signal may be transmitted using conventional copper wiring or wirelessly. The movement of the switch 318 is caused by the narrowed section of the inner wall 320 as it will cause a pushing effect on the switch which will cause it to move into a position where the alarm is generated when the coloured section 316 is exposed. In some configurations the control system 328 will cause the height adjustment to halt at this point but in other configurations the alarm will just continue as a warning that the height of the upper section 310*a* (and subsequently the height of the support portion 126 or support platform 312) is exceeding what are deemed to be safe levels.

We now describe the jib 302 with reference again to FIG. 3.

Jib 302 comprises a first straight section 340*a* and a second straight section 340*b* which may each be formed from a suitable material such as steel. They may also be covered with a cushion portion to improve the comfort of a patient when the patient is being supported on the apparatus 100. The first straight section 340*a* extends outwardly relative to second upstanding member 112*b* to a bend portion 342 where the jib 302 bends around to second straight section 340*b* which extends back toward the second upstanding member 112*b*.

As illustrated in FIG. 3, the first support platform section 314*a* comprises an upstanding section 344 which extends from the first support platform section 314*a* to a slider portion 346 which is arranged to slide along first straight section 340*a* and second straight section 340*b* to enable the first support platform section 314*a* to be moved toward the second support platform section 314*b* as illustrated by arrow C. Similarly, second support platform section 314*b* may also be slidably coupled to the first straight section 340*a* and second straight section 340*b* to enable the second support platform section 314*b* to be moved toward the first support platform section 314*a*.

Figure 6:
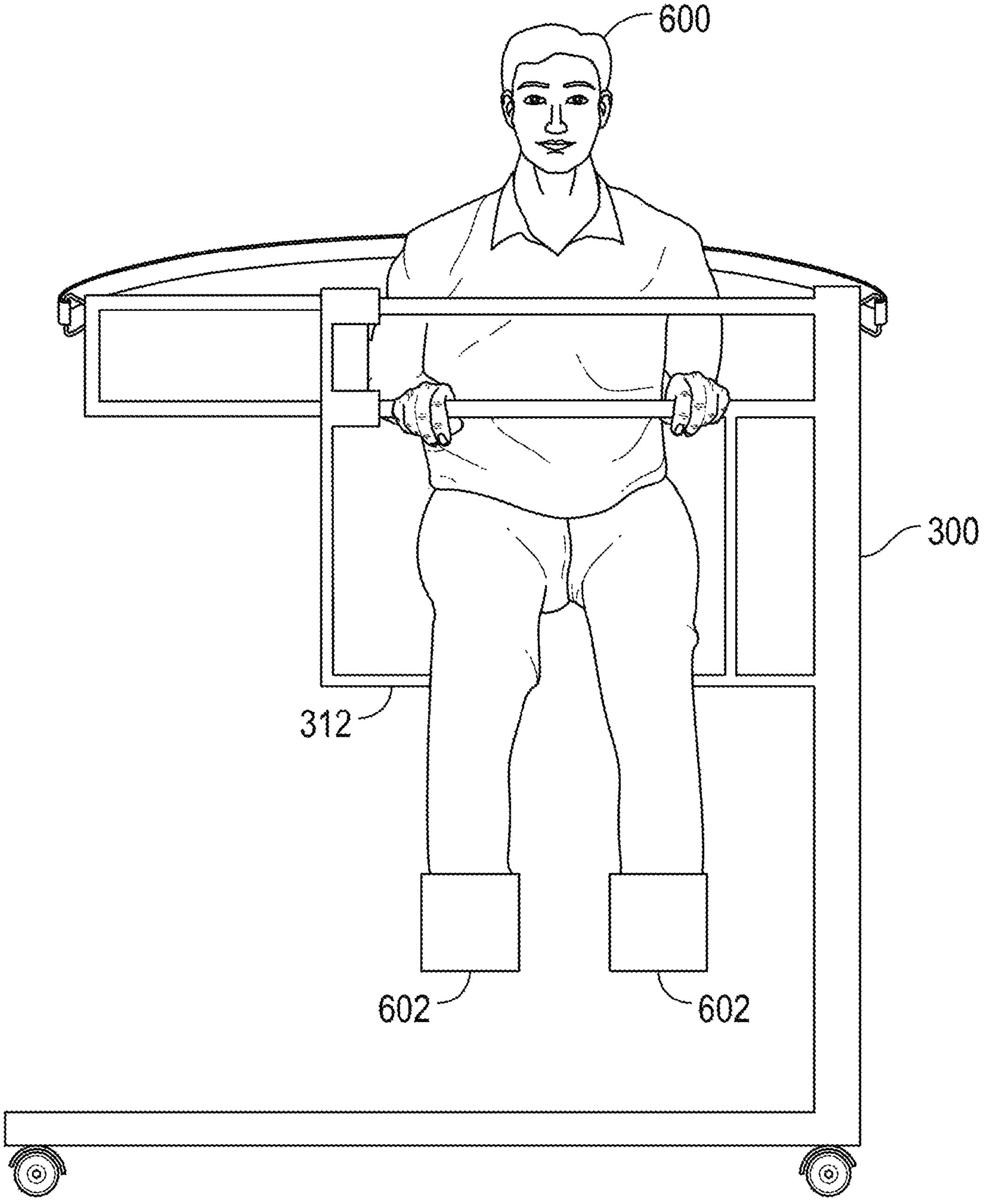
FIG. 6 illustrates a patient support apparatus being used to transport a patient.

The first support platform section 314*a* and the second support platform section 314*b* may be moved in such a way that a gap exists between them to facilitate toileting. A patient 600 supported on the patient support apparatus 300 is illustrated in FIG. 6. As will be clear, the patient is in the seated position on support platform 312 with feet 602 dangling. In this position, the patient 600 can be transported or toileted in comfort without any need for the undignifying use of a hoist or a commode.

The patient support apparatus described herein provides an apparatus which can support a patient above a surface in a seated position. The patient can be transported or toileted whilst they are supported on the apparatus without the need for hoists.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:

1. Patient support apparatus for supporting a patient above a first surface, the apparatus comprising:

a support frame movable across a second surface to a position adjacent the first surface;

a support portion comprising an aperture to facilitate toileting, the support portion extending outwardly relative to the support frame, the support portion positionable on the first surface to enable the patient to be moved onto the support portion so that the patient is held on the support portion above the first surface;

a first rail and a second rail joined by a handle, and a bed pan portion mounted on the first rail and the second rail, wherein the first rail and the second rail are configured to translate together in parallel directions relative to the support portion to allow the bed pan portion mounted thereon to move relative to the support portion;

wherein the support portion comprises a back rest portion coupled at a first end to the support portion and further comprises a free-end which is arranged to be pulled around the back of the patient and attached to the support portion to secure the patient in the seated position on the support portion, and wherein the first rail and the second rail are configured to translate together relative to the support portion to enable the bed pan portion mounted thereon to slide between a first position below the support portion underneath the aperture for receiving detritus from the patient and a second position for disposal of the detritus.

2. Apparatus according to claim 1, wherein the support portion comprises a limb extending outwardly relative to the support frame, wherein the limb comprises a first major surface for supporting the patient above the first surface and a second major surface to be positioned adjacent the first surface to bound a bed receiving cavity for the apparatus.

3. Apparatus according to claim 2, wherein the support frame comprises a base member which forms a base for the apparatus and which bounds the bed receiving cavity.

4. Apparatus according to claim 1, wherein the support frame comprises a plurality of castors to enable the apparatus to be moved across the second surface to a position adjacent the first surface.

5. Apparatus according to claim 1, wherein the support frame comprises a plurality of wheels to enable the apparatus the moved across the second surface to a position adjacent the first surface.

6. Apparatus according to claim 1, wherein the support portion is configured to support the patient in a seated position.

7. Apparatus according to claim 6, wherein the support comprises a seat portion arranged to support the patient in a seated position when being held by the support portion.

8. Apparatus according to claim 6, wherein the support portion comprises a hand rail.

9. Apparatus according to claim 8, wherein the hand rail is movable in a first plane and a second plane transverse relative to the first plane.

10. Apparatus according to claim 9, wherein the hand rail is hinged to the support portion to enable movement in the first and second planes.

11. Apparatus according to claim 9, wherein movement of the hand rail is electrically actuated in response to user input from a control system.

12. Apparatus according to claim 1, wherein the height of the support portion is adjustable.

13. Apparatus according to claim 12, wherein the height adjustment of the support portion is controlled electrically.

14. Apparatus according to claim 11, wherein the control system is configured to generate an alarm responsive to the height of the support portion exceeding a safety threshold.

15. Apparatus according to claim 12, further comprising a visual indication portion to indicate the height of the support portion has exceeded a safety threshold.

16. Apparatus according to claim 1, wherein the first rail and the second rail are supported by the support frame at predefined positions, and wherein the first rail and the second rail are configured to translate together in parallel directions relative to both the support frame and the support portion.

* * * * *